(12) United States Patent
Wanner et al.

(10) Patent No.: US 11,080,200 B2
(45) Date of Patent: Aug. 3, 2021

(54) ALLOCATION OF MACHINE LEARNING TASKS INTO A SHARED CACHE

(71) Applicant: Apple Inc., Cupertino, CA (US)

(72) Inventors: Fabian P. Wanner, Sunnyvale, CA (US); Cecile M. Foret, Palo Alto, CA (US); Xiaozhong Yao, Cupertino, CA (US); Sundararaman Hariharasubramanian, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 3 days.

(21) Appl. No.: 16/601,501

(22) Filed: Oct. 14, 2019

(65) Prior Publication Data

US 2020/0379911 A1 Dec. 3, 2020

Related U.S. Application Data

(60) Provisional application No. 62/855,900, filed on May 31, 2019.

(51) Int. Cl.
| | | |
|---|---|---|
| *G06F 13/00* | (2006.01) | |
| *G06F 12/0875* | (2016.01) | |
| *G06N 3/04* | (2006.01) | |
| *G06N 3/063* | (2006.01) | |
| *G06F 12/126* | (2016.01) | |
| *G06N 3/08* | (2006.01) | |
| *G06F 12/084* | (2016.01) | |
| *G06F 12/0891* | (2016.01) | |

(52) U.S. Cl.
CPC ........ *G06F 12/0875* (2013.01); *G06F 12/084* (2013.01); *G06F 12/0891* (2013.01); *G06F 12/126* (2013.01); *G06N 3/04* (2013.01); *G06N 3/063* (2013.01); *G06N 3/08* (2013.01); *G06F 2212/452* (2013.01)

(58) Field of Classification Search
CPC ............... G06F 12/0875; G06F 12/084; G06F 12/0891; G06F 12/126; G06F 2212/452; G06N 3/063; G06N 3/04; G06N 3/08
See application file for complete search history.

(56) References Cited

U.S. PATENT DOCUMENTS

| | | | |
|---|---|---|---|
| 6,246,972 B1 * | 6/2001 | Klimasauskas | G05B 13/0275 700/30 |
| 9,886,663 B2 | 2/2018 | Sarah et al. | |
| 10,186,011 B2 | 1/2019 | Nurvitadhi et al. | |
| (Continued) | | | |

FOREIGN PATENT DOCUMENTS

| | | | |
|---|---|---|---|
| CN | 105808454 A | * | 7/2016 |
| WO | WO 2018/058426 | | 4/2018 |

*Primary Examiner* — Jing-Yih Shyu
(74) *Attorney, Agent, or Firm* — Morgan, Lewis & Bockius LLP

(57) ABSTRACT

The subject technology receives code corresponding to a neural network (NN) model, the code including particular operations that are performed by the NN model. The subject technology determines, among the particular operations, a set of operations that are to be allocated to a cache of the electronic device that is to execute the NN model. The subject technology generates a set of cache indicators corresponding to the determined set of operations. The subject technology compiles the code and the generated set of cache indicators to provide a compiled binary for the NN model to execute on a target device.

20 Claims, 6 Drawing Sheets

(56) References Cited

U.S. PATENT DOCUMENTS

| | | | |
|---|---|---|---|
| 2005/0102657 A1* | 5/2005 | Lewis | G06F 9/45516 |
| | | | 717/140 |
| 2015/0286471 A1* | 10/2015 | Raz | G06F 8/447 |
| | | | 717/152 |
| 2016/0313991 A1* | 10/2016 | Wei | G06F 12/0875 |
| 2017/0161604 A1* | 6/2017 | Craddock | G06N 3/0454 |
| 2018/0088996 A1* | 3/2018 | Rossi | G06F 9/5016 |
| 2018/0204117 A1 | 7/2018 | Brevdo | |
| 2018/0239992 A1 | 8/2018 | Chalfin et al. | |
| 2018/0247197 A1 | 8/2018 | Tucker et al. | |
| 2018/0322387 A1* | 11/2018 | Sridharan | G06N 3/084 |
| 2019/0056885 A1 | 2/2019 | Mathuriya et al. | |
| 2019/0073590 A1* | 3/2019 | Wu | G06T 1/20 |
| 2019/0130268 A1 | 5/2019 | Shiring et al. | |
| 2019/0286973 A1* | 9/2019 | Kovvuri | G06N 3/063 |
| 2020/0379740 A1* | 12/2020 | Paek | G06N 3/063 |

\* cited by examiner

ALLOCATION OF MACHINE LEARNING TASKS INTO A SHARED CACHE

CROSS-REFERENCE TO RELATED APPLICATIONS

The present application claims the benefit of U.S. Provisional Patent Application Ser. No. 62/855,900, entitled "ALLOCATION OF MACHINE LEARNING TASKS INTO A SHARED CACHE," filed May 31, 2019, which is hereby incorporated herein by reference in its entirety and made part of the present U.S. Utility Patent Application for all purposes.

TECHNICAL FIELD

The present description generally relates to compiling a neural network model for execution on a target platform.

BACKGROUND

Software engineers and scientists have been using computer hardware for machine learning to make improvements across different industry applications including image classification, video analytics, speech recognition and natural language processing, etc. Notably, neural networks are being utilized more frequently to create systems that can perform different computing tasks based on training from sizable amounts of data.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
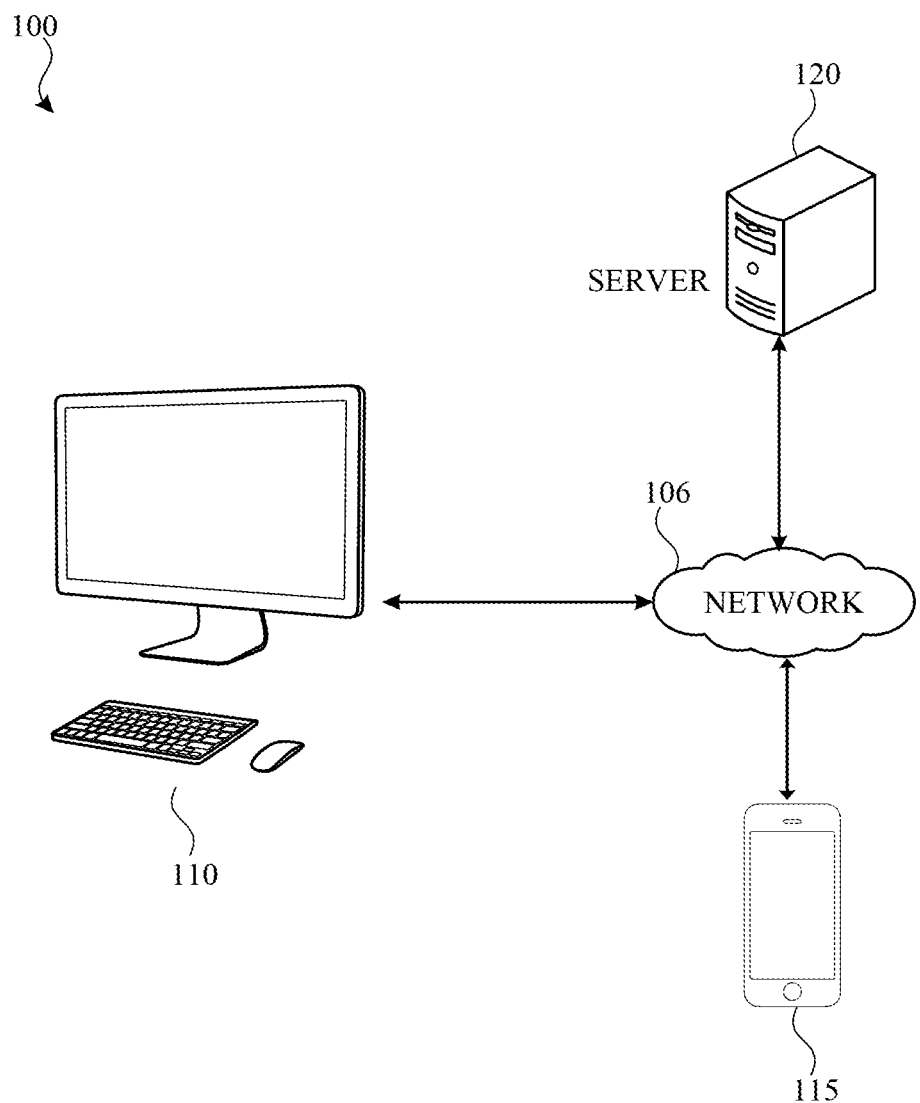
FIG. 1 illustrates an example network environment in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Machine learning has seen a meteoric rise in popularity in recent years due to the availability of massive amounts of training data, and advances in more powerful and efficient computing hardware. One prevalent machine learning technique is utilizing a deep neural network to perform a set of machine learning tasks. For training a deep neural network, a common approach is utilizing a graphical processing unit (GPU), and also for executing the deep neural network on new input data post-training.

On a given platform for executing one or more neural networks, a limited amount of memory may be provided by the platform. For example, modern computing devices frequently include various types of memory including faster cache memory (e.g., on-chip memory) and slower main memory (e.g., off-chip memory), such as dynamic random access memory or DRAM. Executing such neural networks on faster cache memory can improve the performance of the neural networks since the performance penalty of accessing the slower DRAM is avoided. Further, on some computing platforms, such as a mobile device, accessing DRAM also incurs a greater expenditure of power when compared to accessing faster cache memory.

Implementations of the subject technology described herein improve the computing functionality of an electronic device by enabling, when possible, utilization of faster cache memory by a given neural network while being executed by the electronic device by at least including cache indicators during the compilation process of the neural network. For example, a cache indicator may indicate whether faster cache memory (e.g., on-chip memory) is preferable for a given task or operation of the neural network, e.g., in view of the relative performance penalty that would be incurred from using slower off-chip memory (e.g., DRAM).

Such cache indicators enable other hardware components (e.g., a cache engine or controller) to perform allocations of cache memory during runtime, where the allocation of cache memory can be prioritized for tasks or operations for which the cache memory is preferred. Advantageously, the neural network can prioritize access to faster cache memory and therefore perform machine learning tasks that are completed more quickly. These benefits therefore are understood as improving the computing functionality of a given electronic device, such as an end user device which may generally have less computational resources available than, e.g., one or more cloud-based servers.

FIG. 1 illustrates an example network environment 100 for in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110, an electronic device 115, and a server 120. The network 106 may communicatively (directly or indirectly) couple the electronic device 110 and/or the server 120, the electronic device 115 and/or the server 120, and/or electronic device 110 and/or the electronic device 115. In one or more implementations, the network 106 may be an interconnected network of devices that may include, or may be communicatively coupled to, the Internet. For explanatory purposes, the network environment 100 is illustrated in FIG. 1 as including an electronic device 110, an electronic device 115, and a server 120; however, the network environment 100 may include any number of electronic devices and any number of servers.

The electronic device 110 may be, for example, a desktop computer, a portable computing device such as a laptop computer, a smartphone, a peripheral device (e.g., a digital camera, headphones), a tablet device, a wearable device such as a watch, a band, and the like. In FIG. 1, by way of example, the electronic device 110 is depicted as a desktop computer. The electronic device 110 may be, and/or may include all or part of, the electronic system discussed below with respect to FIG. 6.

In one or more implementations, the electronic device 110 and/or the server 120 may provide a system for compiling a given neural network model. In an example, the subject system, using the compiled code, can create an executable software package for deployment on a target platform, such as the electronic device 115, with facilitation from the server 120. When executing the compiled code, the target platform can perform a given operation(s) of the neural network model.

The electronic device 115 may be, for example, a portable computing device such as a laptop computer, a smartphone, a peripheral device (e.g., a digital camera, headphones), a tablet device, a wearable device such as a watch, a band, and the like, or any electronic device. The electronic device may further include processors having different compute capabilities, including, for example, a CPU, a GPU, and/or a neural processor. In FIG. 1, by way of example, the electronic device 115 is depicted as a smartphone device. In one or more implementations, the electronic device 115 may be, and/or may include all or part of, the electronic system discussed below with respect to FIG. 6.

In one or more implementations, the server 120 deploys the compiled code included in an executable software package to a target device for execution. The electronic device 115, in an example, may be a target device for receiving the software package with the compiled neural network code and for executing the compiled code in a runtime environment of the electronic device 115. The electronic device 115 (or any electronic device that is a target device) may include a framework that is enabled to execute operations in the compiled code of the neural network. A framework can refer to a software environment that provides particular functionality as part of a larger software platform to facilitate development of software applications.

Figure 2:
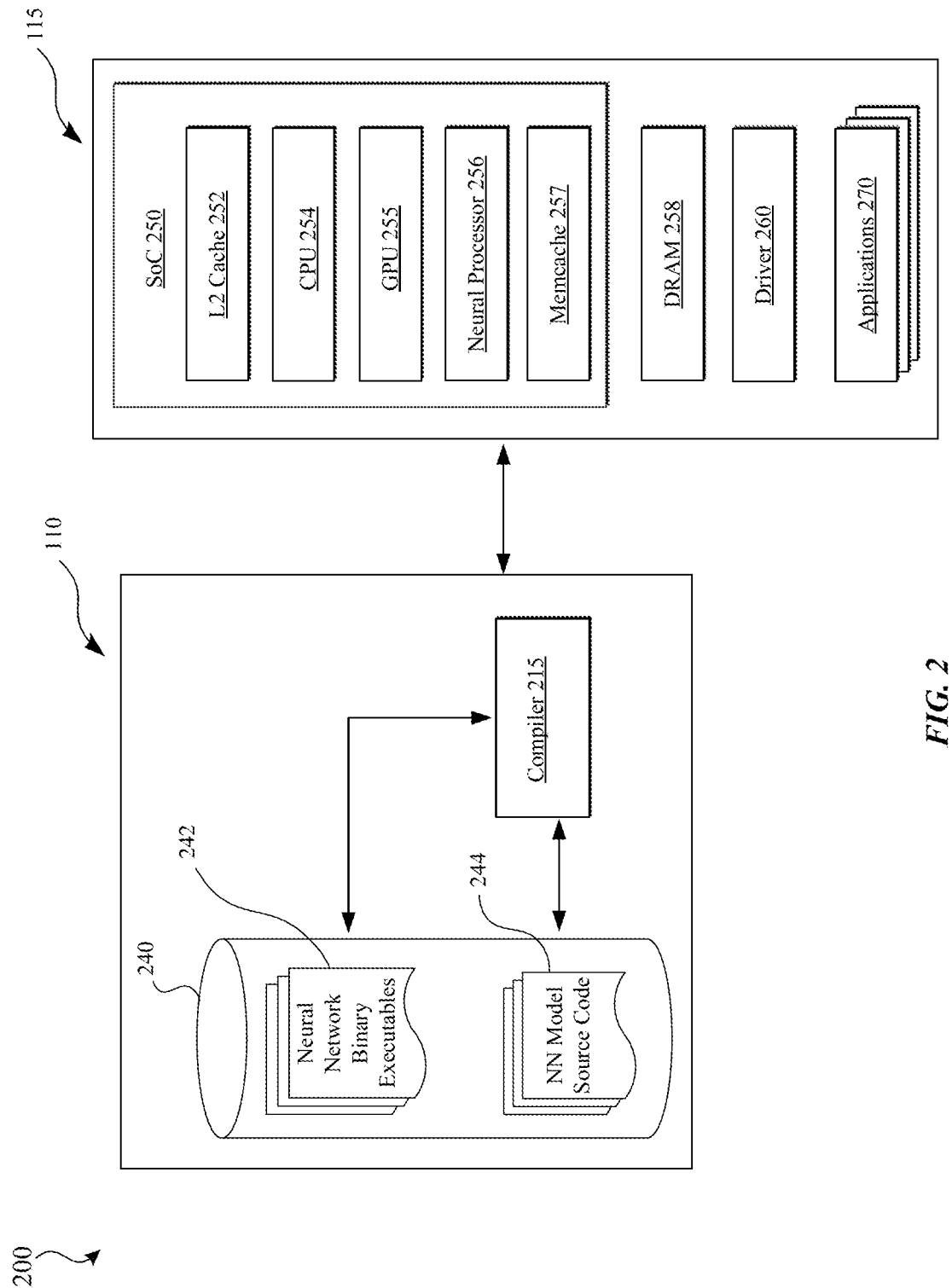
FIG. 2 illustrates an example computing architecture for compiling neural networks with cache indicators in accordance with one or more implementations.

FIG. 2 illustrates an example computing architecture 200 for compiling neural networks with cache indicators in accordance with one or more implementations. For explanatory purposes, the computing architecture is described as being provided by the electronic device 110 of FIG. 1, such as by a processor and/or memory of the electronic device 110; however, the computing architecture may be implemented by any other electronic device. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated, the computing architecture 200 includes the electronic device 110 and the electronic device 115. The electronic device 110 includes a compiler 215, and a memory 240. The memory 240 includes neural network (NN) model source code 244, which after being compiled by the compiler 215, generates neural network (NN) binary executables 242 that can be deployed to different target platforms for execution. In an example, the NN model source code 244 may include code for various algorithms, which may be utilized, alone or in combination, to implement particular functionality for executing on a given target device. A target device, as discussed above, may include various hardware sensors and different processors (e.g., as provided by the electronic device 115) that can be utilized when running the NN binary executable 242 on the target device. In an example, the particular functionality may include image processing or computer vision related functionality, speech recognition, natural language processing, etc.

Although the compiler 215 is provided on the electronic device 110 in the example of FIG. 2, in some implementations, such a compiler may be provided on a particular electronic device (e.g., the electronic device 115) that locally compiles source code and executes the compiled code on the same device. In an implementation, the NN model source code 244 can be compiled for a specific target platform and then deployed to a different device such as the electronic device 115 for execution. In an example, the NN model source code 244 can at least include code corresponding to a set of operations (e.g., machine learning tasks) that are to be performed by corresponding nodes from each layer of a given NN model. As referred to herein a machine learning task corresponds to at least one operation performed by a given node in a particular layer of a given NN model. It is appreciated that a machine learning task, in an implementation, can refer to various operations performed by multiple nodes (e.g., in the same layer or multiple layers) in the network. In an example, the code of an operation in a layer of the NN is a respective function call for performing the operation and/or a set of parameters for the function call. Further, code corresponding to input and output feature(s), data structures, and feature types may be included in the NN model source code 244.

As discussed further below, a target device (e.g., the electronic device 115) can include multiple processors (e.g., CPU, GPU, neural processor (NP)) for performing operations of a given NN model where each processor has access to memory, such as a cache or slower dynamic random access memory (DRAM) provided by the target device, which is shared among the processors of the target device. Given the memory constraints of the target device, various operations of the NN model that are performed by the aforementioned processors may not be always fit within the cache to provide better performance and instead are stored within slower DRAM memory to complete such operations.

In an implementation, the compiler 215 analyzes the NN model source code 244 and determines which data of a given neural network (NN) model that would benefit from being placed in faster memory (e.g., the memcache 257) instead of slower memory (e.g., the DRAM 258). Such data may include, for example, data corresponding to the aforementioned input and output feature(s), and/or data structures of the NN model. By way of example, respective outputs of operations by the NN model can be in the form of data structures such as a container (e.g., tensor) that can store data in N dimensions (e.g., a matrix, a vector, array, array of arrays, etc.).

In an implementation, the compiler 215 performs the following: 1) determines machine learning tasks that are performed by the NN model based on the code, 2) determines which machine learning tasks should be allocated in the faster memcache 257 for improved performance, and 3) generates cache indicators to associate with respective machine learning tasks to enable, during runtime, the compiled NN model to allocate the memcache 257 (e.g., when possible) or not allocate the memcache 257 (and instead place into slower DRAM instead).

As referred to herein, a cache indicator may include information indicating whether to request an allocation of memory in the shared cache, or to perform another operation such as evicting or invalidating data already stored in the shared cache. Such information, in an example, may be included in an instruction (e.g., as part of a memory transaction) sent to a processor (e.g., CPU, GPU, NP) which is then processed by the processor for determine whether to request an allocation of memory within cache or slower memory or to evict a portion of memory. For allocating the memcache 257, the compiler 215 may use knowledge regarding a size of the memcache 257 available on a target device to determine whether an allocation of the memcache 257 is feasible.

For a given cache indicator, the compiler 215 can include information corresponding to a particular operation of a node of the NN network, or associate the cache indicator to a set of operations from a single node or performed across different nodes and/or layers of the NN network. In the aforementioned memory transaction which can include a set of instructions that is eventually sent to a processor (or multiple processors depending on the operation to be performed), a cache indicator may be associated with each of the instructions. In another example, not every instruction in the memory transaction includes a cache indicator depending on the instruction. In one or more implementations, cache indicators may be included with operations where the preferred memory changes, e.g. from on-chip memory to off-chip memory, or vice-versa, such as when the preferred memory remains static for multiple consecutive operations.

In an implementation, the compiler 215 utilizes the following strategies/guidelines to generate cache indicators when compiling code for the NN model. Data that is only utilized once is not preferred/prioritized for placement in the cache and may be placed in slower DRAM instead if needed. Further, data that is utilized more than once, is preferred/prioritized for placement in cache. The compiler 215 can also determine whether to request data to be evicted from the cache (e.g., a cache drop operation to invalidate a portion of the cache with the data) for data that it is utilized more than once, but is at a last operation where the data is no longer being used. Moreover, the compiler 215 can assign a first priority value to a first set of data such that this data is given priority over another data (e.g., which has been assigned a lower priority value) for placement in the cache.

Such priorities can be based on performance requirements (e.g., cost): how fast the data is needed to be read e.g., to comply with requirements of the machine learning task being performed by the NN network and/or whether there is a greater compute requirement for the task than memory requirements—in this case placing data into slower memory would not impact performance in a substantial way. Additionally, the compiler 215 can consider energy requirements e.g., whether the task should be placed in the cache to meet energy and/or temperature requirements of the target device executing the NN network.

The compiler 215 further processes the source code with the generated cache indicators and compiles this code into a NN binary executable for a target device, which can be stored in neural network executables 242 and then be deployed to the target device for execution (e.g., the electronic device 115). Although the compiler 215 is provided on the electronic device 110 in the example of FIG. 2, in some implementations, such a compiler may be provided on a particular electronic device that compiles code for a neural network model and executes the compiled neural network model on the same device. As discussed above, a neural network model can be compiled from the NN model source code 244 for a specific target platform and then deployed to a different device such as the electronic device 115 for execution.

As further illustrated, the electronic device 115, in one or more implementations, includes a system-on-chip (SOC) 250. The SOC 250 may include an L2 cache 252 (e.g., on-chip memory), a CPU 254, a GPU 255, and a neural processor 256. The electronic device 115 further includes a memcache 257 and a DRAM 258 (e.g., off-chip memory).

In one or more implementations, the memcache 257 may be on-chip (e.g., part of the SOC 250, as shown in the example of FIG. 2) or off-chip (not shown). In addition, with respect to power, performance and/or accessibility, the memcache 257 may fall in between the L2 cache 252 and the DRAM 258. For example, the memcache 257 may be more general purpose than the L2 cache 252, but not as general purpose as the DRAM 258.

The DRAM 258 may be slower memory to access than the memcache 257 and/or the L2 cache 252. In one or more implementations, the DRAM 258 may be shared across multiple (e.g., all) tasks and processing units with respect to the electronic device 115. Accessing the DRAM 258 may consume computing resources by the electronic device 115 as it may utilize a relatively significant amount of power, and may impact performance of the NN model by slowing down memory-bound layers of the NN (e.g., pooling layer, element-wise layer, etc.). In comparison, the memcache 257 in an implementation is faster than the DRAM 258 but is smaller in size than the DRAM 258. Consequently, often times data (e.g., input, output, intermediate while processing, etc.) corresponding to operations of the NN model will not fit in the memcache 257 and is instead stored in the DRAM 258.

Use of the memcache 257 (e.g., based on cache indicator (s)) may be managed, for example, through the quota system or general access permissions, by providing access to the memcache 257 to some tasks or engines (e.g., and not to other tasks or engines). In one or more implementations, the memcache 257 may be checked prior to the DRAM 258 with respect to data request(s). For example, a cache indicator as described herein may have been generated (e.g., by the compiler 215) to allocate data to the memcache 257. However, that data may or may not still be available on the memcache 257. A request may be made (e.g., by a respective engine) to a driver for the memcache 257 to collect the data. If the data is still available in the memcache 257, the data may be obtained from the memcache 257 and sent to the respective engine. If the data is no longer available in the memcache 257, the request for data may be forwarded to the DRAM 258 and obtained from the DRAM 258. It is also possible that only some of the data is still available in the memcache 257, which may result in the available part of the data being obtained from the memcache 257, and the remaining part of the data from the DRAM 258.

Thus, in one or more implementations, the compiler 215 may have the option to place data for subsequent access in one or more of the following: the L2 cache 252 (e.g., corresponding to the fastest relative access), the DRAM 258 with cache indicator(s) to enable the use of the memcache 257 (e.g., corresponding to the second fastest relative access), and/or the DRAM 258 without cache indicator(s) for the memcache 257 (e.g., corresponding to third fastest relative access).

As further shown, a driver 260 is provided by an operating system (OS) running on the electronic device 115. The driver 260, in an example, allows other software (e.g., one or more applications 270) to communicate with firmware which enables such software to control (e.g., via execution of commands) one or more components of hardware such as the neural processor 256, the CPU 254, the GPU 255, the memcache 257 and/or the DRAM 258 included in the electronic device 115. The driver 260, as discussed further herein, may request various operations involving the memcache 257 and/or the DRAM 258 based at least in part on cache indicators included in one or more memory transactions as part of executing a given NN model. Further, although one driver is illustrated in the example of FIG. 2 for the sake of simplicity, it is appreciated that in an implementation various drivers for hardware components are provided. For example, a respective driver can be provided for each of the aforementioned processors in addition to a driver for the memcache 257 and/or the DRAM 258.

In an implementation, during runtime of the NN model, a client application from the applications 270 that executes the binary of the NN model can send operations (e.g., a request including a set of instructions and/or cache indicators) to the driver 260 to facilitate processing by the neural processor 256, the CPU 254, the GPU 255, the memcache 257 and/or the DRAM 258. In an implementation, the driver 260 can receive such operations from the client application and forward the operations (e.g., when involving a memory transaction) to a cache engine (not shown) provided by the memcache 257 for processing. Based on the cache indicators, the cache engine can determine whether to allocate memory in the memcache 257, evict a portion of data in the memcache 257, or instead allocate memory in the DRAM 258. An example interaction between the driver 260 and the memcache 257 is discussed further in FIG. 3 below.

Recently, specialized (e.g., dedicated) hardware has been developed that is optimized for performing particular operations from a given NN. A given electronic device may include a neural processor 256, which can be implemented as circuitry that performs various machine learning operations based on computations including multiplication, adding and accumulation. Such computations may be arranged to perform, for example, convolution of input data. A neural processor 256, in an example, is specifically configured to perform machine learning algorithms, typically by operating on predictive models such as NNs. In one or more implementations, an electronic device may include a neural processor 256 in addition to a CPU 254 and/or a GPU 255.

A CPU, as discussed herein, can refer to a main processor in a given electronic device that performs operations for basic arithmetic, logical, control and input/output operations specified by the instructions of a computer program or application, including some operations for neural network models. A GPU, as discussed herein, can refer to a specialized electronic circuit designed to perform operations for rendering graphics, which may also be utilized in many instances to process computational workloads for machine learning operations (e.g., as specified by instructions of a computer program or application). The CPU, GPU, and neural processor may each have different computational specifications and capabilities depending on their respective implementations where each of the aforementioned components can provide varying degrees of performance for certain operations in comparison with the other components.

Figure 3:
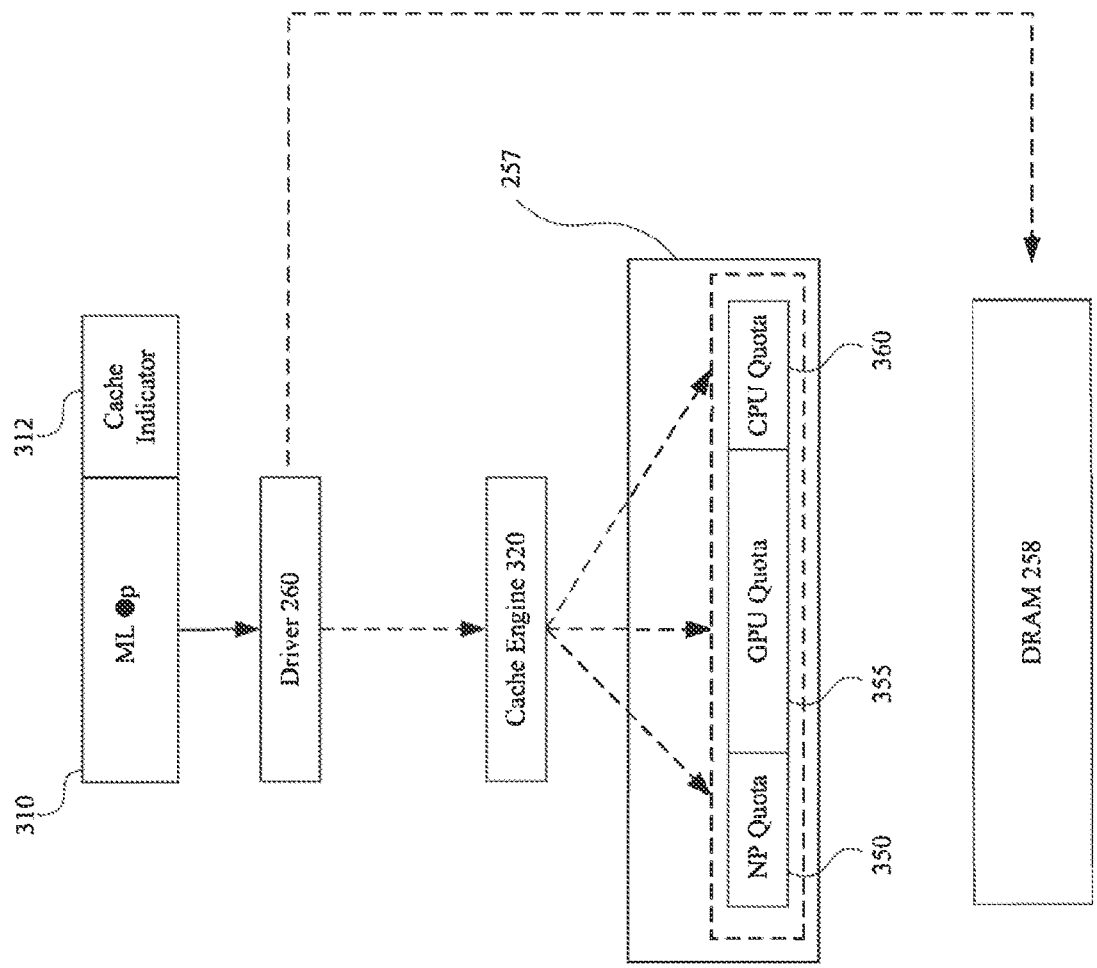
FIG. 3 illustrates an example of processing a machine learning operation with respect to on-chip memory, such as a cache, and/or off-chip memory, such as DRAM, based on a cache indicator provided in the operation.

FIG. 3 illustrates an example of processing a machine learning operation with respect to an on-chip cache (e.g., the memcache 257) and/or an off-chip cache (e.g., the DRAM 258) based on a cache indicator provided in the operation. FIG. 3 will be discussed with reference to components of the computing architecture 200 described in FIG. 2.

As shown in FIG. 3, the driver 260 can receive a machine learning (ML) operation 310 (e.g., from a client application executing a NN model), which is part of a memory transaction of a neural network model. The driver 260 can analyze a cache indicator 312 that is provided with the ML operation 310 to determine whether to request an allocation of memory in the memcache 257. The driver 260 can utilize knowledge of respective quotas of the memcache 257 that are assigned to each processor on a target device, such as the electronic device 115, to determine whether the allocation is feasible based on an amount of available memory. As illustrated, the driver 260 can assign, for the memcache 257, a quota 350 to the neural processor 256, a quota 355 to the GPU 255, and a quota 360 to the CPU 254. For example, if the size of the memcache 257 is 16 megabytes (16 MB), the quota 350 can have a size of 4 MB, the quota 355 can have a size of 8 MB, and the quota 360 can have a size of 4 MB. The driver 260 can also share information regarding the quotas to a cache engine 320, which handles requests from the driver 260, as discussed further below.

It is understood, however, that the respective sizes of each quota can by be dynamically adjusted by the driver 260 during runtime of the NN model as the memory on the electronic device 115 is shared among other applications and/or other NN models that are also concurrently executing with the NN model. In an example, the driver 260 can receive multiple ML operations that involve different memory transactions from two or more respective applications that each execute respective NN models. In an implementation, the driver 260 can determine respective sizes of memory allocations for the ML operations, and sum the respective sizes to determine a combined memory allocation size. The driver 260 can then adjust the respective sizes of the quotas based on the combined memory allocation size and can also inform the cache engine 320 of the adjusted quotas. Further, when other applications and/or NN models stop executing, the driver 260 can adjust the respective sizes of the quotas in response to memory not being utilized by the applications and/or NN models that are no longer executing.

In an example, the driver 260 can forward a request to a cache engine 320 for allocating memory in the memcache 257. In an implementation, the cache engine 320 may be a hardware cache controller provided by a target device such as the electronic device 115, which may be included as part of the SOC 250. In another implementation, the cache engine 320 may be a software component (e.g., a secure daemon application) or implemented in the firmware of the electronic device 115.

After receiving the request from the driver 260, the cache engine 320 can perform an allocation of memory in the memcache 257 corresponding to the CPU 254, the GPU 255, or the neural processor 256 depending on the request. In an example where the cache engine 320 is unable to allocate the requested memory, the driver 260 can receive an indication from the cache engine 320 that the request has failed. In response, the driver 260 can request an allocation of memory from the DRAM 258 instead.

Figure 4:
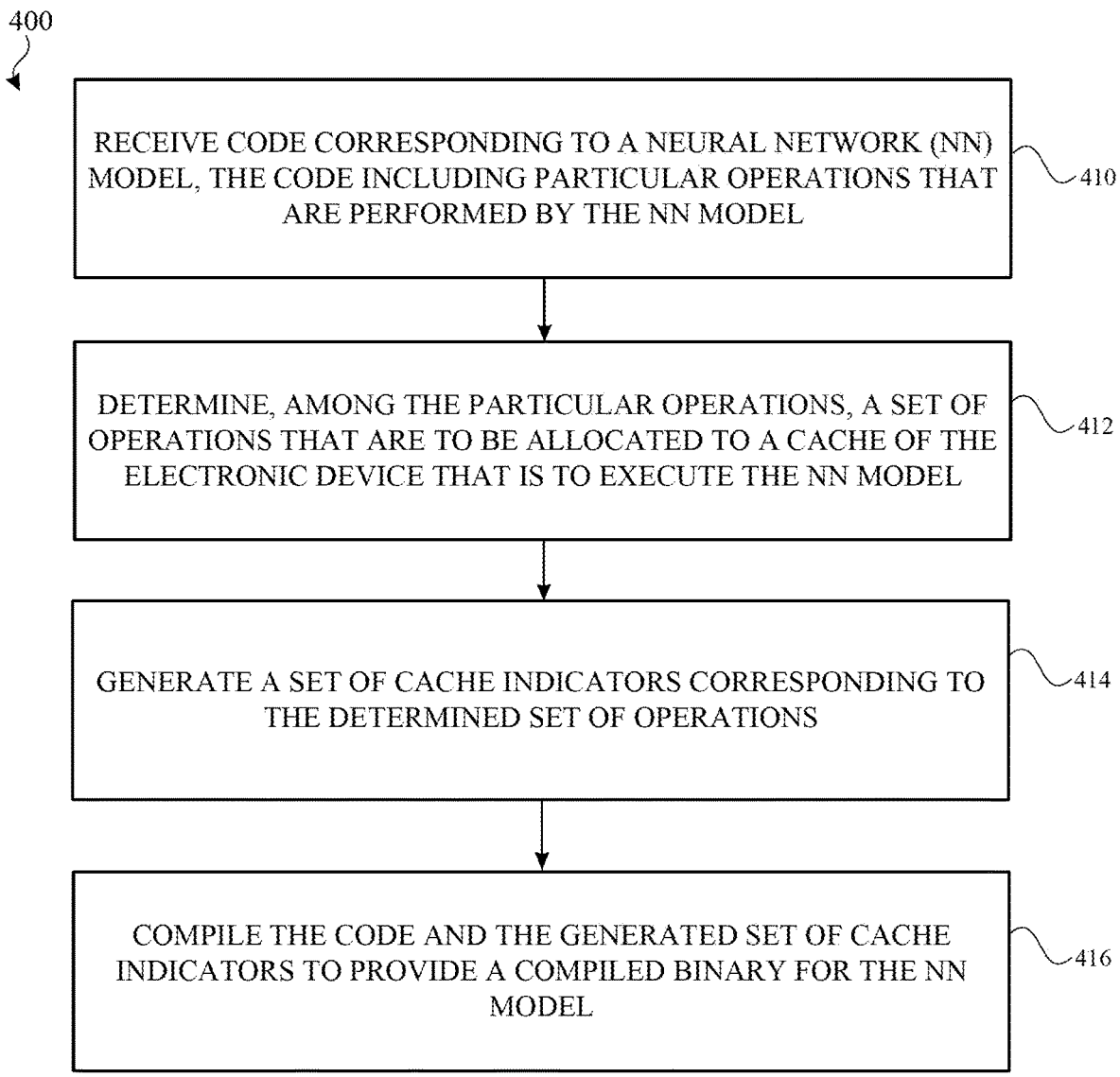
FIG. 4 illustrates a flow diagram of an example process for compiling a neural network with cache indicators in accordance with one or more implementations.

FIG. 4 illustrates a flow diagram of an example process 400 for compiling a neural network with cache indicators in accordance with one or more implementations. For explanatory purposes, the process 400 is primarily described herein with reference to components of the computing architecture 200 of FIG. 2, which may be executed by one or more processors of the electronic device 110 of FIG. 1. However, the process 400 is not limited to the electronic device 110, and one or more blocks (or operations) of the process 400 may be performed by one or more other components of other suitable devices, such as by the electronic device 115. Further for explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

The compiler 215 receives code corresponding to a neural network (NN) model (410). In an example, the code includes particular operations that are performed by the NN model. At least some of the particular operations include respective data that is to be stored in memory of an electronic device during execution of the NN model.

The compiler 215 determines, among the particular operations, a set of operations that are to be preferably allocated to a shared cache of the electronic device that is to execute the NN model (412). In an implementation, the compiler 215 determines the set of operations based at least in part on whether a particular operation uses data that is accessed more than a single time during execution of the particular operation, or uses data that is accessed by two respective operations performed by the NN model.

Further, the compiler 215 generates a set of cache indicators corresponding to the determined set of operations (414). In an implementation, the set of cache indicators includes information indicating whether to request an allocation of memory in the shared cache. In addition, the compiler 215 compiles the code and the generated set of cache indicators to provide a compiled binary for the NN model to execute on a target device (416). For example, this may correspond with generating the binary code with the generated set of cache indicators to provide a compiled binary for the NN model.

Figure 5:
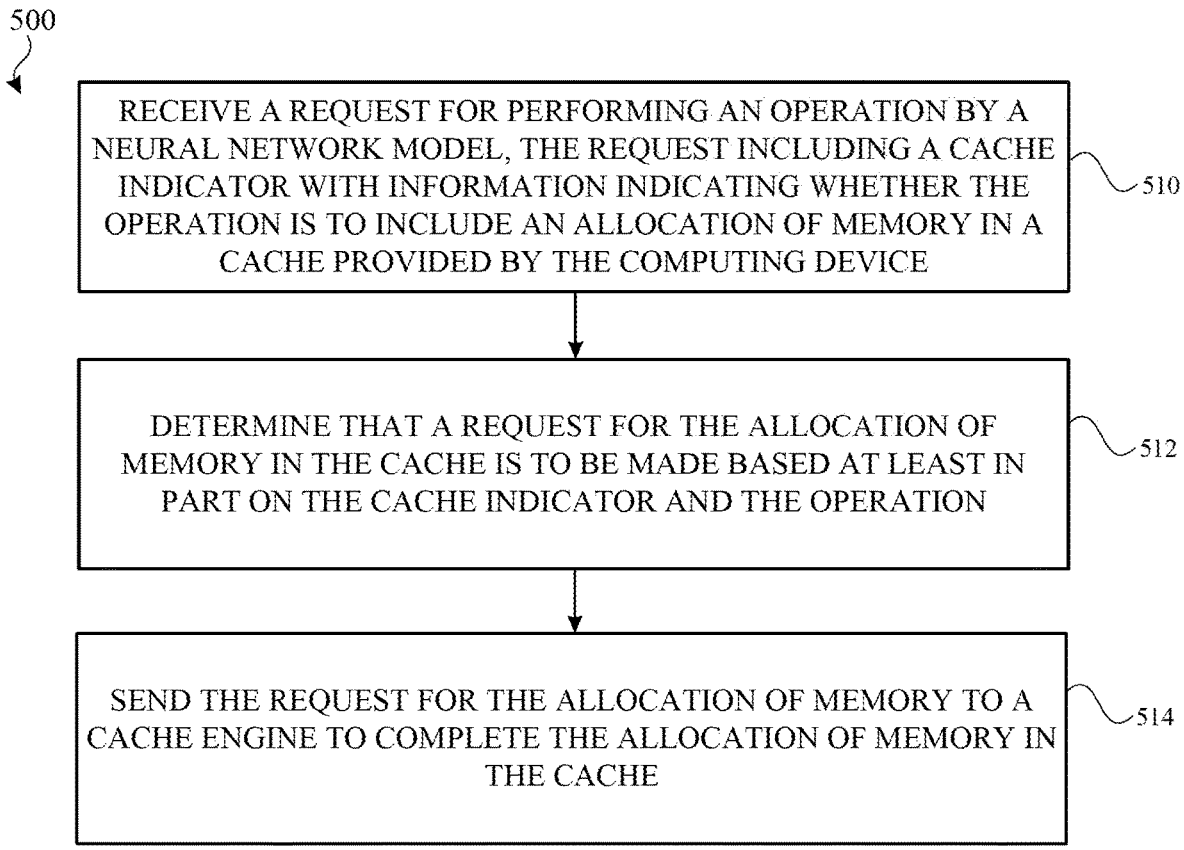
FIG. 5 illustrates a flow diagram of an example process for allocating memory for a neural network based on a cache indicator in a memory transaction in accordance with one or more implementations.

FIG. 5 illustrates a flow diagram of an example process for allocating memory for a neural network based on a cache indicator in a memory transaction in accordance with one or more implementations. For explanatory purposes, the process 500 is primarily described herein with reference to components of the computing architecture 200 of FIG. 2, which may be executed by one or more processors of the electronic device 110 of FIG. 1. However, the process 500 is not limited to the electronic device 110, and one or more blocks (or operations) of the process 500 may be performed by one or more other components of other suitable devices, such as by the electronic device 115. Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

The driver 260 receives a request for performing an operation by a neural network model (510). In an example, the request includes a cache indicator with information indicating whether the operation is to include an allocation of memory in a cache provided by the computing device.

The driver 260 determines that a request for the allocation of memory in the cache is to be made based at least in part on the cache indicator and the operation (512). The driver 260 sends the request for the allocation of memory to a cache engine to complete the allocation of memory in the cache (514).

Figure 6:
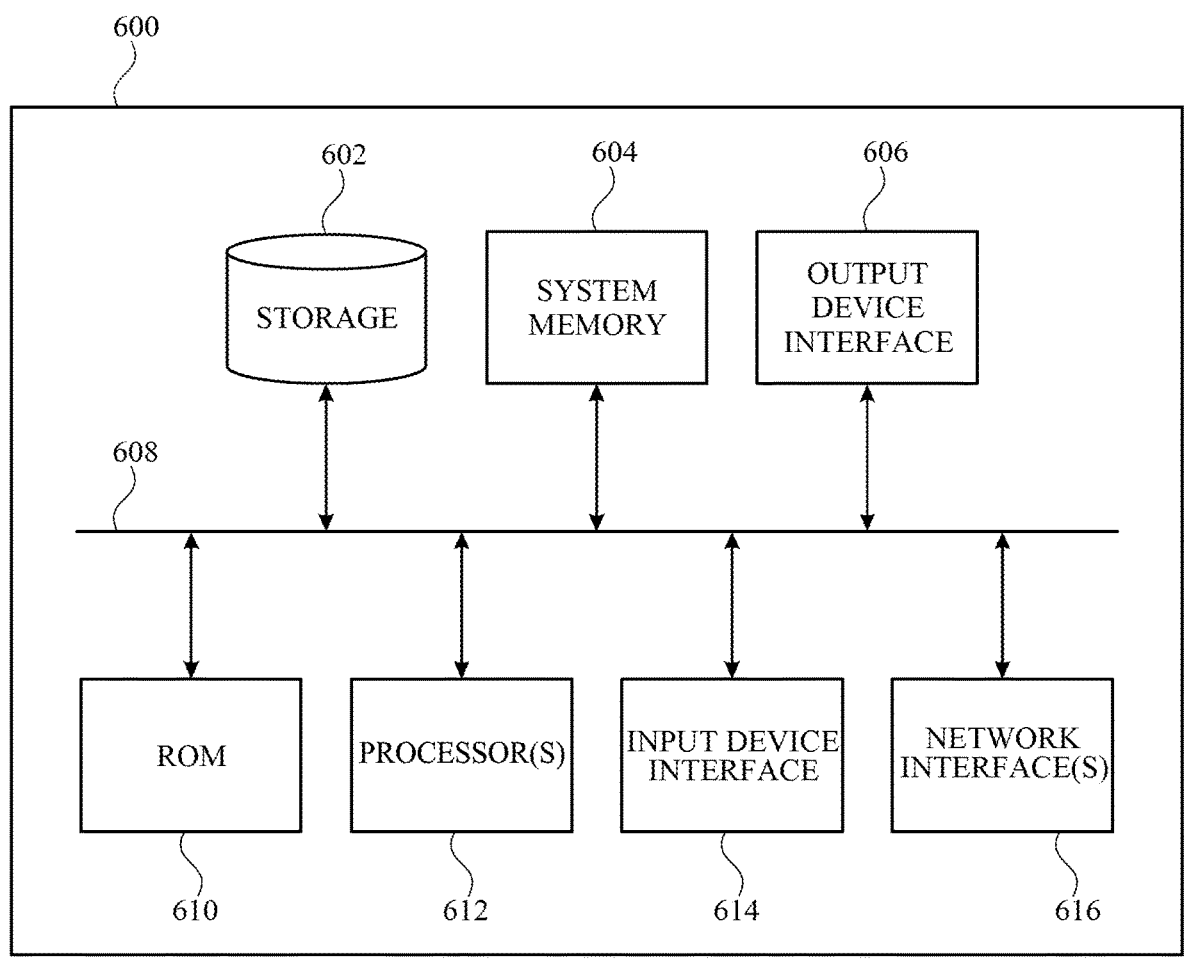
FIG. 6 illustrates an electronic system with which one or more implementations of the subject technology may be implemented.

FIG. 6 illustrates an electronic system 600 with which one or more implementations of the subject technology may be implemented. The electronic system 600 can be, and/or can be a part of, the electronic device 110, the electronic device 115, and/or the server 120 shown in FIG. 1. The electronic system 600 may include various types of computer readable media and interfaces for various other types of computer readable media. The electronic system 600 includes a bus 608, one or more processing unit(s) 612, a system memory 604 (and/or buffer), a ROM 610, a permanent storage device 602, an input device interface 614, an output device interface 606, and one or more network interfaces 616, or subsets and variations thereof.

The bus 608 collectively represents all system, peripheral, and chipset buses that communicatively connect the numerous internal devices of the electronic system 600. In one or more implementations, the bus 608 communicatively connects the one or more processing unit(s) 612 with the ROM 610, the system memory 604, and the permanent storage device 602. From these various memory units, the one or more processing unit(s) 612 retrieves instructions to execute and data to process in order to execute the processes of the subject disclosure. The one or more processing unit(s) 612 can be a single processor or a multi-core processor in different implementations.

The ROM 610 stores static data and instructions that are needed by the one or more processing unit(s) 612 and other modules of the electronic system 600. The permanent storage device 602, on the other hand, may be a read-and-write memory device. The permanent storage device 602 may be a non-volatile memory unit that stores instructions and data even when the electronic system 600 is off. In one or more implementations, a mass-storage device (such as a magnetic or optical disk and its corresponding disk drive) may be used as the permanent storage device 602.

In one or more implementations, a removable storage device (such as a floppy disk, flash drive, and its corresponding disk drive) may be used as the permanent storage device 602. Like the permanent storage device 602, the system memory 604 may be a read-and-write memory device. However, unlike the permanent storage device 602, the system memory 604 may be a volatile read-and-write memory, such as random access memory. The system memory 604 may store any of the instructions and data that one or more processing unit(s) 612 may need at runtime. In one or more implementations, the processes of the subject disclosure are stored in the system memory 604, the permanent storage device 602, and/or the ROM 610. From these various memory units, the one or more processing unit(s) 612 retrieves instructions to execute and data to process in order to execute the processes of one or more implementations.

The bus 608 also connects to the input and output device interfaces 614 and 606. The input device interface 614 enables a user to communicate information and select commands to the electronic system 600. Input devices that may be used with the input device interface 614 may include, for example, alphanumeric keyboards and pointing devices (also called "cursor control devices"). The output device interface 606 may enable, for example, the display of images generated by electronic system 600. Output devices that may be used with the output device interface 606 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 6, the bus 608 also couples the electronic system 600 to one or more networks and/or to one or more network nodes, such as the electronic device 115 shown in FIG. 1, through the one or more network interface (s) 616. In this manner, the electronic system 600 can be a part of a network of computers (such as a LAN, a wide area network ("WAN"), or an Intranet, or a network of networks, such as the Internet. Any or all components of the electronic system 600 can be used in conjunction with the subject disclosure.

One aspect of the present technology may include accessing data. The present disclosure contemplates that in some instances, this data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used in various machine learning applications. Accordingly, use of such personal information data enables users the benefits of such machine learning applications.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of machine learning applications, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
    receiving code corresponding to a neural network (NN) model, the code including particular operations that are performed by the NN model, wherein at least some of the particular operations include respective data that is to be stored in memory of an electronic device during execution of the NN model;
    determining, among the particular operations, a set of operations that are to be allocated to a cache of the electronic device that is to execute the NN model;
    generating a set of cache indicators corresponding to the determined set of operations, wherein the set of cache indicators includes information indicating whether to request an allocation of memory in the cache; and
    compiling the code and the generated set of cache indicators to provide a compiled binary for the NN model to execute on a target device.

2. The method of claim 1, wherein the particular operations are performed by at least one of a neural processor, a GPU, or a CPU, and each of the particular operations corresponds to at least a machine learning operation performed by the NN model, and the cache is shared between the neural processor, the GPU, and the CPU.

3. The method of claim 2, wherein a respective quota of memory is assigned to at least one of the neural processor, the GPU, or the CPU based at least in part on a predetermined amount of memory that the particular operations uses when the NN model is executed by the target device.

4. The method of claim 3, wherein the respective quota of memory is constrained based at least in part on a size of cache memory provided by the target device, and
    the respective quota of memory is dynamic such that, during execution of the NN model by the target device, a particular processor of the target device in enabled to request an allocation of memory based at least in part on the respective quota of memory.

5. The method of claim 1, wherein the set of operations includes only one operation.

6. The method of claim 1, wherein generating the set of cache indicators corresponding to the determined set of operations further comprises generating further information indicating the particular operation uses data only a single time and that the data is to be stored in a second memory slower than the cache.

7. The method of claim 1, wherein generating the set of cache indicators corresponding to the determined set of operations further comprises generating further information indicating the particular operation uses data multiple times and that the data is to be stored in the cache.

8. The method of claim 1, wherein generating the set of cache indicators corresponding to the determined set of operations comprises generating further information indicating a cache drop operation to invalidate a portion of the cache corresponding to data that is no longer utilized by the determined set of operations.

9. The method of claim 1, wherein determining the set of operations is based at least in part on whether a particular operation uses data that is accessed more than a single time during execution of the particular operation.

10. The method of claim 1, wherein the set of operations that are to be allocated to the cache is based at least in part on a set of priorities, the set of priorities indicating particular data is given priority over other data for placement in the cache based on performance requirements or energy requirements.

11. A system comprising;
    a processor;
    a memory device containing instructions, which when executed by the processor cause the processor to:
        receive code corresponding to a neural network (NN) model, the code including particular operations that are performed by the NN model, wherein at least some of the particular operations include respective data that is to be stored in memory of an electronic device during execution of the NN model;
        determine, among the particular operations, a set of operations that are to be allocated to a cache of the electronic device that is to execute the NN model;
        generate a set of cache indicators corresponding to the determined set of operations, wherein the set of cache indicators includes information indicating whether to request an allocation of memory in the cache; and
        compile the code and the generated set of cache indicators to provide a compiled binary for the NN model to execute on a target device.

12. The system of claim 11, wherein the particular operations are performed by at least one of a neural processor, a GPU, or a CPU, and each of the particular operations corresponds to at least a machine learning operation performed by the NN model, and the cache is shared between the neural processor, the GPU, and the CPU.

13. The system of claim 12, wherein a respective quota of memory is assigned to at least one of the neural processor, the GPU, or the CPU based at least in part on a predetermined amount of memory that the particular operations uses when the NN model is executed by the target device.

14. The system of claim 13, wherein the respective quota of memory is constrained based at least in part on a size of cache memory provided by the target device, and
    the respective quota of memory is dynamic such that, during execution of the NN model by the target device, a particular processor of the target device in enabled to request an allocation of memory based at least in part on the respective quota of memory.

15. The system of claim 14, wherein the set of operations includes only one operation.

16. The system of claim 11, wherein to generate the set of cache indicators corresponding to the determined set of operations further causes the processor to generate further information indicating the particular operation uses data only a single time and that the data is to be stored in a second memory slower than the cache.

17. The system of claim 11, wherein to generate the set of cache indicators corresponding to the determined set of operations further causes the processor to generate further information indicating the particular operation uses data multiple times and that the data is to be stored in the cache.

18. The system of claim 11, wherein to generate the set of cache indicators corresponding to the determined set of operations further causes the processor to generate further information indicating a cache drop operation to invalidate a portion of the cache corresponding to data that is no longer utilized by the determined set of operations.

19. The system of claim 11, wherein to determine the set of operations is based at least in part on whether a particular operation uses data that is accessed more than a single time during execution of the particular operation.

20. A non-transitory computer-readable medium comprising instructions, which when executed by a computing device, cause the computing device to perform operations comprising:
receiving a request for performing an operation by a neural network model, the request including a cache indicator with information indicating whether the operation is to include an allocation of memory in a cache provided by the computing device;
determining that a request for the allocation of memory in the cache is to be made based at least in part on the cache indicator and the operation; and
sending the request for the allocation of memory to a cache engine to complete the allocation of memory in the cache.

* * * * *

UNITED STATES PATENT AND TRADEMARK OFFICE
CERTIFICATE OF CORRECTION

PATENT NO. : 11,080,200 B2
APPLICATION NO. : 16/601501
DATED : August 3, 2021
INVENTOR(S) : Wanner et al.

It is certified that error appears in the above-identified patent and that said Letters Patent is hereby corrected as shown below:

In the Claims

Column 16, Line 22 (Claim 11), Replace "comprising;" with --comprising:--.

Signed and Sealed this
Ninth Day of November, 2021

Drew Hirshfeld
*Performing the Functions and Duties of the
Under Secretary of Commerce for Intellectual Property and
Director of the United States Patent and Trademark Office*